United States Patent
Mathew et al.

(10) Patent No.: US 11,393,020 B2
(45) Date of Patent: Jul. 19, 2022

(54) EVENT PREDICTION USING CLASSIFIER AS COARSE FILTER

(71) Applicant: The Toronto-Dominion Bank, Toronto (CA)

(72) Inventors: Sangeeta Mathew, Mississauga (CA); Darius Braziunas, Toronto (CA); Arthur Carroll Chow, Markham (CA); Ling Tao, Toronto (CA); Arun Victor Jagga, Mississauga (CA)

(73) Assignee: The Toronto-Dominion Bank, Toronto (CA)

( * ) Notice: Subject to any disclaimer, the term of this patent is extended or adjusted under 35 U.S.C. 154(b) by 52 days.

(21) Appl. No.: 16/592,966

(22) Filed: Oct. 4, 2019

(65) Prior Publication Data

US 2021/0103979 A1 Apr. 8, 2021

(51) Int. Cl.
*G06Q 40/02* (2012.01)
*G06N 20/00* (2019.01)

(52) U.S. Cl.
CPC .............. *G06Q 40/02* (2013.01); *G06N 20/00* (2019.01)

(58) Field of Classification Search
CPC ................................ G06Q 40/02; G06N 20/00
See application file for complete search history.

(56) References Cited

U.S. PATENT DOCUMENTS

| | | | | |
|---|---|---|---|---|
| 10,726,491 B1 * | 7/2020 | Hockey | ................. | G06F 16/285 |
| 10,977,725 B1 * | 4/2021 | Flowers | ............... | G06Q 30/016 |
| 11,042,930 B1 * | 6/2021 | Mintz | .................... | G06Q 40/02 |
| 2011/0295731 A1 * | 12/2011 | Waldron, III | ...... | G06Q 10/0635 |
| | | | | 705/35 |
| 2017/0061534 A1 * | 3/2017 | Vergari | ............. | G06Q 20/4016 |
| 2018/0005229 A1 * | 1/2018 | Grassadonia | ........ | G06Q 20/326 |
| 2019/0057386 A1 * | 2/2019 | Fazeli | .................. | G06Q 40/025 |
| 2019/0102693 A1 * | 4/2019 | Yates | ..................... | G06N 5/003 |
| 2020/0090261 A1 * | 3/2020 | Tumulty, II | ............ | G06Q 20/42 |

OTHER PUBLICATIONS

Radwin, Michael. "Want to delight customers? Apply design thinking to your AI products," The Hive, Medium (Jun. 25, 2019). (Year: 2019).*
Radwin, Michael. "Want to delight customers? Apply design thinking to your AI products," The Hive, Medium (Jun. 25, 2019). (Year: 2019).*
Shalev, Asaf. "Intuit's AI Team in Israel Develops Overdraft Prediction Service," CTECH (Feb. 2, 2018). (Year: 2018).*

* cited by examiner

*Primary Examiner* — Elizabeth H Rosen
(74) *Attorney, Agent, or Firm* — Rowand LLP

(57) ABSTRACT

In an aspect, the present application describes a method including: obtaining account data associated with an account; passing at least some of the account data through a non-sufficient funds classifier, the non-sufficient funds classifier being a machine learning classifier configured to classify the account as either likely to have a non-sufficient funds event or unlikely to have a non-sufficient funds event, the machine learning classifier configured to evaluate a plurality of parameters associated with the account data; in response to determining that the account is likely to have a non-sufficient funds event, forecasting a balance for the account, wherein forecasting the balance for the account includes; and providing, to a client device associated with the account, a notification based on a forecasted balance.

18 Claims, 9 Drawing Sheets

```
                              500

┌────────────────────────────────────────────────────┐
        │   Store a set of candidate rules defining payment cycles │
        │                        502                          │
        └────────────────────────────────────────────────────┘
                                │
        ┌────────────────────────────────────────────────────┐
        │ Identify, from a transaction history for an account, an actual set of transfers made to a │
        │                    first recipient                  │
        │                        504                          │
        └────────────────────────────────────────────────────┘
                                │
        ┌────────────────────────────────────────────────────┐
        │   Identify a first reference transfer from the actual set of transfers │
        │                        506                          │
        └────────────────────────────────────────────────────┘
                                │
        ┌────────────────────────────────────────────────────┐
        │ For each of at least a plurality of candidate rules in the set of candidate rules, identify, │
        │  based on the first reference transfer, an expected set of transfers for that candidate rule │
        │                        508                          │
        └────────────────────────────────────────────────────┘
                                │
        ┌────────────────────────────────────────────────────┐
        │   Identify one of the candidate rules as a closest rule for the actual set of transfers │
        │                        510                          │
        └────────────────────────────────────────────────────┘
                                │
        ┌────────────────────────────────────────────────────┐
        │   Identify a future expected transfer based on the identified one of the candidate rules │
        │                        512                          │
        └────────────────────────────────────────────────────┘
                                │
        ┌────────────────────────────────────────────────────┐
        │   Provide a notification to a client device associated with the account of the future │
        │                   expected transfer.                │
        │                        514                          │
        └────────────────────────────────────────────────────┘
```

FIG. 5

```
                    ┌─────────────┐
                    │   FIG. 6A   │
                    └──────┬──────┘
                           │
┌──────────────────────────┴──────────────────────────┐
│ Send a message to the client device requesting       │
│ confirmation of the identified candidate rule        │
│                      616                             │
└──────────────────────────┬──────────────────────────┘
                           │
┌──────────────────────────┴──────────────────────────┐
│ Identify a future expected transfer based on the     │
│ identified one of the candidate rules                │
│                      618                             │
└──────────────────────────┬──────────────────────────┘
                           │
┌──────────────────────────┴──────────────────────────┐
│ Send a message to the client device requesting       │
│ confirmation of the future expected transfer         │
│                      620                             │
└──────────────────────────┬──────────────────────────┘
                           │
┌──────────────────────────┴──────────────────────────┐
│ Provide a notification to a client device associated │
│ with the account of the future expected transfer     │
│                      622                             │
└──────────────────────────┬──────────────────────────┘
                           │
┌──────────────────────────┴──────────────────────────┐
│ After a predetermined period of time has elapsed     │
│ following the identification of one of the candidate │
│ rules, re-identify one of the candidate rules as the │
│ closest rule.                                        │
│                      624                             │
└─────────────────────────────────────────────────────┘
```

702 Identify, from a set of accounts each having a transfer listing that includes a plurality of transfers with a first counterparty, a first rule matching a pattern of transfers associated with the first counterparty

704 Identify, for a first account not included in the set of accounts, an initial transfer with the first counterparty represented in a transfer listing for that account

706 Identify one or more projected future transfers for the first account based on a date associated with the initial transfer and the first rule

708 Provide a notification to a client device associated with the first account based on the first rule

710 Detect one or more further transfers with the first counterparty from the transfer listing for the first account

712 Determine, based on the one or more further transfers and the initial transfer that a second rule matches a pattern defined by the further transfers and the initial transfers better than the first rule

714 Provide a notification to a client device associated with the first account based on the second rule

Identify, from a set of accounts each having a transfer listing that includes a plurality of transfers with a first counterparty, a first rule matching a pattern of transfers associated with the first counterparty
802

Identify, for a first account not included in the set of accounts, an initial transfer with the first counterparty represented in a transfer listing for that account
804

Identify one or more projected future transfers for the first account based on a date associated with the initial transfer and the first rule
806

Provide a notification to a client device associated with the first account based on the first rule
808

Detect one or more further transfers with the first counterparty from the transfer listing for the first account
810

Identify a second rule as a second most-frequently used rule in the candidate rule set based on the ranking
812

Determine, based on the one or more further transfers and the initial transfer that a second rule matches a pattern defined by the further transfers and the initial transfers better than the first rule
814

Send a message to a client device requesting confirmation of the second rule
816

Receive confirmation of the second rule
818

Provide a notification to a client device associated with the first account based on the second rule
820

EVENT PREDICTION USING CLASSIFIER AS COARSE FILTER

TECHNICAL FIELD

The present disclosure relates to adaptive notifications for accounts and, more specifically, to systems and methods for predicting future account events based on a past transfers and for providing notifications based on such predicted future account events.

BACKGROUND

Transfers between various accounts, such as bank accounts, are often initiated electronically. For example, paychecks may be deposited electronically by way of direct deposit and bills may be paid electronically by way of pre-authorized payments or by way of an electronic payment initiated through an online channel. Since, for example, third parties may have some control over inflows and outflows for a customer account, the convenience provided by such electronic transferring has sometimes left customers with less insight into the status of their account. For example, a user receiving payroll through a cheque may notice when, for example, a cheque is not received for a pay period but a user receiving payroll through direct deposit may not immediately notice a payment that was not received. Some users who do not regularly track inflows and outflows to an account may inadvertently fall short of funds. By way of example, such a user may have a cheque rejected for non-sufficient funds.

Furthermore, many billers such as utility companies, Internet providers, etc., have eschewed paper-based billing in favor of electronic billing. While this offers an added convenience for some users, others may miss bills due to, for example, email fatigue or password fatigue. That is, some bills may go unnoticed because they become overlooked in an email inbox or because a password is required to access such bills and the user has difficulty in remembering the password.

BRIEF DESCRIPTION OF THE DRAWINGS

Embodiments are described in detail below, with reference to the following drawings:

FIG. 5 is a flowchart of an example method in accordance with an example embodiment of the present disclosure;

FIGS. 6A and 6B illustrate a flowchart of an example method in accordance with an example embodiment of the present disclosure;

FIG. 7 is a flowchart of an example method in accordance with an example embodiment of the present disclosure; and FIGS. 8A and 8B are a flowchart of an example method in accordance with an example embodiment of the present disclosure.

Like reference numerals are used in the drawings to denote like elements and features.

DETAILED DESCRIPTION OF VARIOUS EMBODIMENTS

Figure 1:
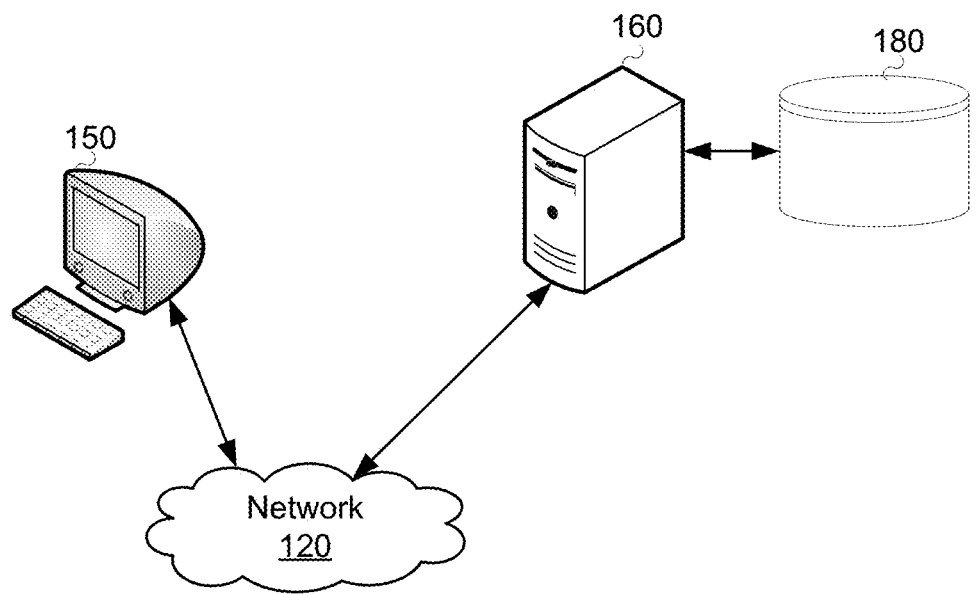
FIG. 1 is a schematic operation diagram illustrating an operating environment of an example embodiment.

Described herein are systems and methods which may, for example, provide notifications to client devices associated with an account when a particular condition associated with the account is detected. For example, in at least some implementations, systems and methods for identifying recurrent transfer patterns are described. Such systems may, for example, be used to identify recurring payments, such as recurring bills, from a transfer listing for a user. By identifying such recurring transfer patterns, such systems may then accurately utilize the identified recurring transfer patterns in order to, for example, identify upcoming transfers, identify possible shortfall events, and/or provide notifications based on such identified conditions.

Conveniently, the systems and methods described herein may perform such identification and notification with little user interaction or configuration. For example, such systems and methods may effectively operate in the background unbeknownst to the user until a notification is issued to the user through the client device.

By way of example, in an aspect the present application describes a computer-implemented method. The method may include: storing a set of candidate rules, the set of candidate rules defining payment cycles; identifying, from a transaction history for an account, an actual set of transfers made to a first recipient; identifying a first reference transfer from the actual set of transfers; for each of at least a plurality of candidate rules in the set of candidate rules, identifying, based on the first reference transfer, an expected set of transfers for that candidate rule; identifying one of the candidate rules as a closest rule for the actual set of transfers by: a) evaluating each of the plurality of candidate rules by determining a distance metric between transfers in the expected set of transfers for that one of the candidate rules and transfers in the actual set of transfers; and b) selecting one of the candidate rules as the closest rule based on the distance metrics. The method may further include: identifying a future expected transfer based on the identified one of the candidate rules; and providing a notification to a client device associated with the account of the future expected transfer.

In at least some implementations, the method may include: identifying a second reference transfer from the actual set of transfers, the second reference transfer different from the first reference transfer; and for each of at least a plurality of candidate rules in the set of candidate rules, identify, based on the second reference transfer, an alternate expected set of transfers for that candidate rule. Identifying one of the candidate rules as the closest rules for the set of transfers may further include evaluating each of the plurality of candidate rules by determining a further distance metric between transfers in the alternate expected set of transfers for that one of the candidate rules and transfers in the actual set of transfers. The selection of one of the candidate rules as the closest rule may be based on the further distance metrics.

In at least some implementations, each of the transfers in the actual set of transfers may be associated with an actual date. Each of the transfers in the expected sets of transfers may be associated with an expected date. The distance metric may be based on a comparison of actual dates and expected dates.

In at least some implementations the distance metric for a candidate rule may be determined as an average of a difference between respective dates in the actual set of transfers and the expected set of transfers for that candidate rule.

In at least some implementations the future expected transfer may be associated with a date and wherein the notification is provided in response to determining that a date of the future expected transfer is within a defined proximity of a current date.

In at least some implementations, each of the transfers in the actual set of transfers may be associated with a value and wherein the distance metrics are determined based on the value.

In at least some implementations, each of the transfers in the actual set of transfers may be associated with an actual value and each of the transfers in the expected sets of transfers may be associated with an expected value and the distance metric may be based on a comparison of actual values and expected values.

In at least some implementations, identifying the future expected transfer may include identifying a value associated with the future expected transfer and wherein the notification identifies the value.

In at least some implementations, the candidate rules may include one or more of following rules: transfers are due monthly; transfers are due weekly; transfers are due yearly; transfers are due monthly but any transfer falling due on a weekend will, instead, be due a next weekday; transfers are due weekly but any transfer falling due on a weekend will, instead, be due on a next weekday; transfers are due yearly but any transfer falling due on a weekend will, instead, be due on a next weekday; transfers are due monthly but any transfer falling due on a weekend or a holiday will, instead, be due a next weekday; transfers are due weekly but any transfer falling due on a weekend or a holiday will, instead, be due on a next weekday; and transfers are due yearly but any transfer falling due on a weekend or a holiday will, instead, be due on a next weekday.

In at least some implementations, the notification may indicate a projected future balance.

In at least some implementations, the method may include sending a message to the client device requesting confirmation of the identified candidate rule or the future expected transfer.

In at least some implementations, the method may include, after a predetermined period of time has elapsed following the identification of one of the candidate rules, re-identifying one of the candidate rules as the closest rule for the actual set of transfers by evaluating each candidate rule based on recent transfers. The recent transfers may include at least some transfers occurring after a previous identification of one of the candidate rules.

Conveniently, such techniques may be used to accurately predict a rule that defines a recurrent transfer pattern. Such techniques may, for example, allow pattern-matching to be performed for each account on an individualized basis. Such individualized pattern matching may, for example, provide improved accuracy of pattern detection since it allows the pattern of transfers for a particular recipient to be different for different accounts. By way of example, some parties may submit a mortgage payment weekly whereas others may submit a mortgage payment monthly.

In some implementations, techniques described herein may be used when a user begins transfers with a particular counterparty for the first time. For example, in some implementations, a recurrent transfer pattern may be identified for an account even when the account has little history of transfers with that counterparty. For example, in at least some implementations, a pattern may be determined based on a single transfer with a counterparty. In such circumstances, when a new counterparty is detected for a particular account, the pattern of recurrent transfers for that counterparty for that account may be initialized based on recurrent transfer for that counterparty for other accounts (e.g., for other users). By way of example, if a particular cellular phone provider tends to be paid monthly (as determined from other user accounts), then the recurrent transfer pattern for that provider and that particular account may be initialized to be a monthly pattern of transfers. Then, once sufficient data is received for the particular account (e.g., once a series of transfers have been performed), the recurrent transfer pattern may be re-assessed based on data from the particular account itself.

Conveniently, such techniques may allow notifications to be provided for a user immediately after a first transfer with a particular counterparty occurs. That is, there is no need to wait until a sufficient number of transfers with the counterparty have occurred before beginning to provide such notifications.

In an aspect, the present application describes a method. The method may include: identifying, from a set of accounts each having a transfer listing that includes a plurality of transfers with a first counterparty, a first rule matching a pattern of transfers associated with the first counterparty; identifying, for a first account not included in the set of accounts, an initial transfer with the first counterparty represented in a transfer listing for that account, and wherein the transfer listing for that account does not include a second transfer with the first counterparty; identifying one or more projected future transfers for first account based on a date associated with the initial transfer and the first rule; detecting one or more further transfers with the first counterparty from the transfer listing for the first account; determining, based on the one or more further transfers and the initial transfer, that a second rule matches a pattern defined by the further transfers and the initial transfers better than the first rule; and providing a notification to a client device associated with the first account based on the second rule.

In at least some implementations, providing the notification to the client device may include: identifying one or more projected future transfers for the first account based on the second rule; determining a forecasted balance by adjusting a current balance based on the one or more projected future transfers; and providing the notification based on the forecasted balance.

In at least some implementations, the notification may be a notification of at least one of the projected further transfers.

In at least some implementations, the method may include: prior to detecting the one or more further transfers, providing a notification to a client device associated with the first account based on the first rule.

In at least some implementations, the first rule and the second rule may be each one of: transfers are due monthly; transfers are due weekly; transfers are due yearly; transfers are due monthly but any transfer falling due on a weekend will, instead, be due a next weekday; transfers are due weekly but any transfer falling due on a weekend will, instead, be due on a next weekday; transfers are due yearly but any transfer falling due on a weekend will, instead, be due on a next weekday; transfers are due monthly but any transfer falling due on a weekend or a holiday will, instead, be due a next weekday; transfers are due weekly but any transfer falling due on a weekend or a holiday will, instead, be due on a next weekday; and transfers are due yearly but any transfer falling due on a weekend or a holiday will, instead, be due on a next weekday.

In at least some implementations, the method may include sending a message to the client device requesting confirmation of the second rule.

In at least some implementations, the first account may include a bank account.

In at least some implementations, identifying the first rule matching a pattern of transfers associated with the first counterparty may be performed by ranking a plurality of rules in a candidate rule set based on frequency of use in the set of accounts, and wherein the first rule is identified as being most frequently used.

In at least some implementations, the method may further include, prior to determining that the second rule matches a pattern defined by the further transfers and the initial transfers better than the first rule, identifying the second rule as a second most-frequently used rule in the candidate rule set based on the ranking and wherein the determining that the second rule matches a pattern defined by the further transfers and the initial transfers better than the first rule is performed in response to the identifying of the second rule.

In at least some implementations, detecting one or more further transfers with the first counterparty from the transfer listing for the first account may include determining that the first account includes at least a threshold number of transfers with the first counterparty. The determining that the second rule matches a pattern defined by the further transfers and the initial transfers better than the first rule may be performed in response to determining that the first account includes at least the threshold number of transfers.

Conveniently, techniques described herein may be used to monitor for predicted conditions, such as a shortfall in funds, and to notify an affected user when such conditions are predicted. At least some techniques described herein are optimized to reduce a computing burden placed on a system performing such predictive analysis. For example, one technique may save processing resources by using a classifier as a coarse filter. For example, a non-sufficient funds classifier may be used as a course filter to identify accounts that should be further analyzed by performing more computationally-intensive analysis techniques. Such an approach may allow automated monitoring of a large volume of accounts without overburdening computing system resources.

For example, in an aspect a method of notifying of a predicted condition is described. The method may include: obtaining account data associated with an account; passing at least some of the account data through a non-sufficient funds classifier, the non-sufficient funds classifier including a machine learning classifier configured to classify the account as either likely to have a non-sufficient funds event or unlikely to have a non-sufficient funds event, the machine learning classifier configured to evaluate a plurality of parameters associated with the account data; in response to determining that the account is likely to have a non-sufficient funds event, forecasting a balance for the account, wherein forecasting the balance for the account includes: a) identifying one or more projected future transfers for the account by identifying a pattern of past transfers associated with the account; and b) determining a forecasted balance by adjusting a current balance based on the one or more projected future transfers; and providing, to a client device associated with the account, a notification based on the forecasted balance.

In at least some implementations, the method may further include, prior to passing at least some of the account data through the non-sufficient funds classifier, training the non-sufficient funds classifier based on a training set. The training set may include account data for a plurality of accounts and a non-sufficient funds indication for each of the accounts. The non-sufficient funds indication may indicate whether the associated account is associated with a non-sufficient funds event.

In at least some implementations, training may include determining respective weights for the plurality of parameters.

In at least some implementations, the plurality of parameters may include one or more of: a past non-sufficient funds event; a location indicator identifying a location; an account duration indicating a length of time since the account was opened; a balance; an indication of decrease in income; and an indication of spending in a defined spending category.

In at least some implementations, the notification may be provided in response to determining that the forecasted balance is expected to fall below a defined threshold.

In at least some implementations, the defined threshold may be zero.

In at least some implementations, the notification may include a selectable option to transfer value from another account.

In at least some implementations, the future transfers may include at least one incoming transfer and at least one outgoing transfer.

In at least some implementations, the account data may be passed through the non-sufficient funds classifier includes a transaction listing.

In at least some implementations, the account data may be passed through the non-sufficient funds classifier includes biographical data.

In another aspect, there is described a computing system, such as a server. The computing system includes a communications module, a processor coupled to the communications module and a memory storing processor-executable instructions which, when executed, configure the processor to perform a method described herein.

In a further aspect, there is provided a non-transitory computer readable storage medium including processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 (which may also be referred to as a server computer system or a computing system) and a client device 150 communicate via a network 120. The client device 150 is a computing device that may be associated with an entity, such as a user, customer or client, having an account associated with the server 160. The account may be an account that is used for storing resources or value. In one particular example, the account may be a bank account and the server may be associated with a financial institution such as a bank. For example, the server 160 may track, manage, maintain, and/or lend resources to the entity. The resources may, for example, be computing resources, such as memory or processor cycles. By way of further example, the resources may include stored value, such as fiat currency, which may be represented in a database. For example, the server 160 may be coupled to a database 180, which may be provided in secure storage. The secure storage may be provided internally within the server 160 or externally. The secure storage may, for example, be provided remotely from the server 160. For example, the secure storage may include one or more data centers. The data centers may, for example, store data with bank-grade security.

The database 180 may include records for a plurality of accounts and at least some of the records may define a quantity of resources. For example, the entity that is associated with the client device 150 may be associated with an account having one or more records in the database. The records may reflect a quantity of stored resources that are associated with the entity and a transfer listing. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts.

Accordingly, an account may be associated with a transaction history, which may also be referred to as a transfer history or a transaction history herein. The transaction history is a listing of past transactions. The transaction history may include both incoming transactions (i.e., transfers in which the associated account is the recipient of a transfer of value) and outgoing transactions (i.e., transfers in which another account is the recipient of a transfer of value from the associated account). Each transaction/transfer in the transaction history is associated with at least a date and a quantum of value. For example, each transfer may define an amount of resources transferred and the date on which the transfer occurred. Each transfer may also include one or more identifiers, such as a counterparty identifier. The counterparty identifier may, for an incoming transfer, identify a sender and, for an outgoing transfer, identify a recipient.

The entity that is associated with the client device 150 and the account may be a customer of a financial institution which operates or manages the server 160. The financial institution may, for example, offer retail banking services to the entity.

The client device 150 and the server 160 may be in geographically disparate locations. Put differently, the client device 150 may be remote from the server 160.

The client device 150 and the server 160 are computer systems. The client device 150 may take a variety of forms including, for example, a mobile communication device such as a smartphone, a tablet computer, a wearable computer such as a head-mounted display or smartwatch, a laptop or desktop computer, or a computing device of another type.

The client device 150 may communicate with the server 160 via the network 120 in order to manage the use of resources. For example, the client device 150 may access the server to access a graphical user interface for viewing account data such as for example, the transaction listing. As will be described herein, the server 160 may, in at least some embodiments, provide notifications to the client device 150.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2:
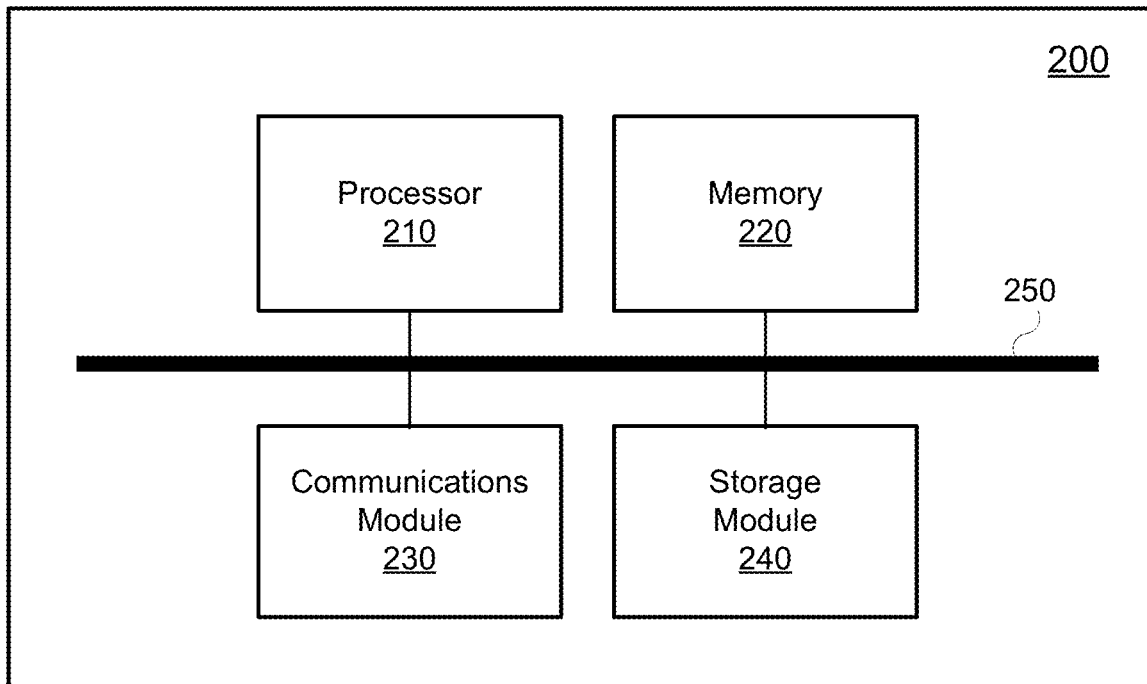
FIG. 2 is high-level schematic diagram of an example computing device.

The client device 150 and the server 160 are computing devices. Referring now to FIG. 2, a high-level operation diagram of an example computing device 200 will now be described. The example computing device 200 may be exemplary of the client device 150 and/or the server 160.

The example computing device 200 includes a variety of modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the example computing device 200 to communicate using near-field communication (NFC), via Wi-Fi™, using Bluetooth™ or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Where the example computing device 200 functions as the server 160 of FIG. 1, the storage module 240 may allow the example computing device 200 to access the secure data in the database 180.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

The computing device 200 will include other components apart from those illustrated in FIG. 2 and the specific component set may differ based on whether the computing device 200 is operating as the client device 150 or the server 160. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Furthermore, the server 160 is a system which may be comprised of numerous computing devices that are communicably connected to one other (e.g., over a network).

Figure 3:
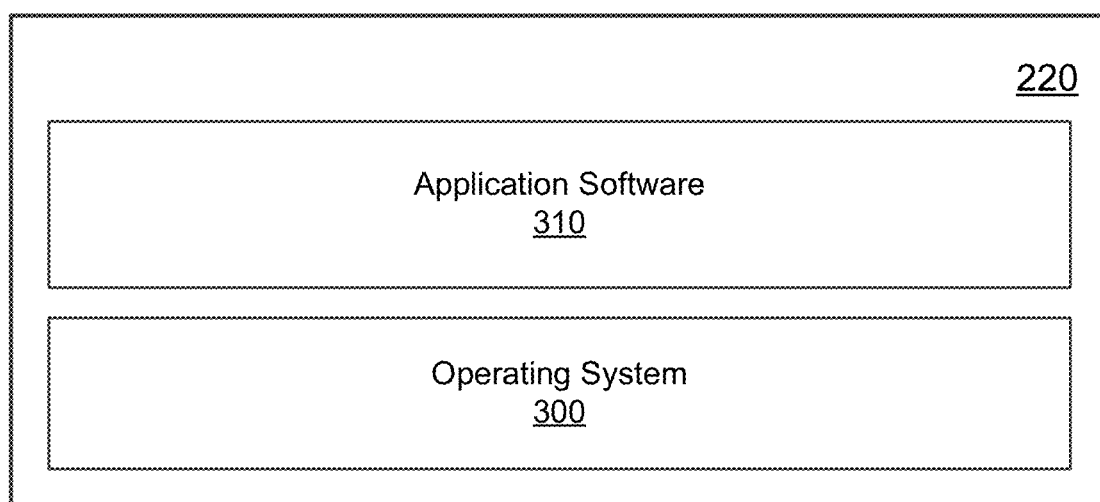
FIG. 3 shows a simplified organization of software components stored in a memory of the example computing device of FIG. 2.

FIG. 3 depicts a simplified organization of software components stored in the memory 220 of the example computing device 200 (FIG. 2). As illustrated, these software components include an operating system 300 and an application 310.

The operating system 300 is software. The operating system 300 allows the application 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application 310 adapts the example computing device 200, in combination with the operating system 300, to operate as a device performing a particular function. For example, the application 310 may cooperate with the operating system 300 to adapt a suitable embodiment of the example computing device 200 to operate as the client device 150, the server 160 and/or the administrator device 170.

While a single application 310 is illustrated in FIG. 3, in operation the memory 220 may include more than one application 310 and different applications 310 may perform different operations.

Figure 4:
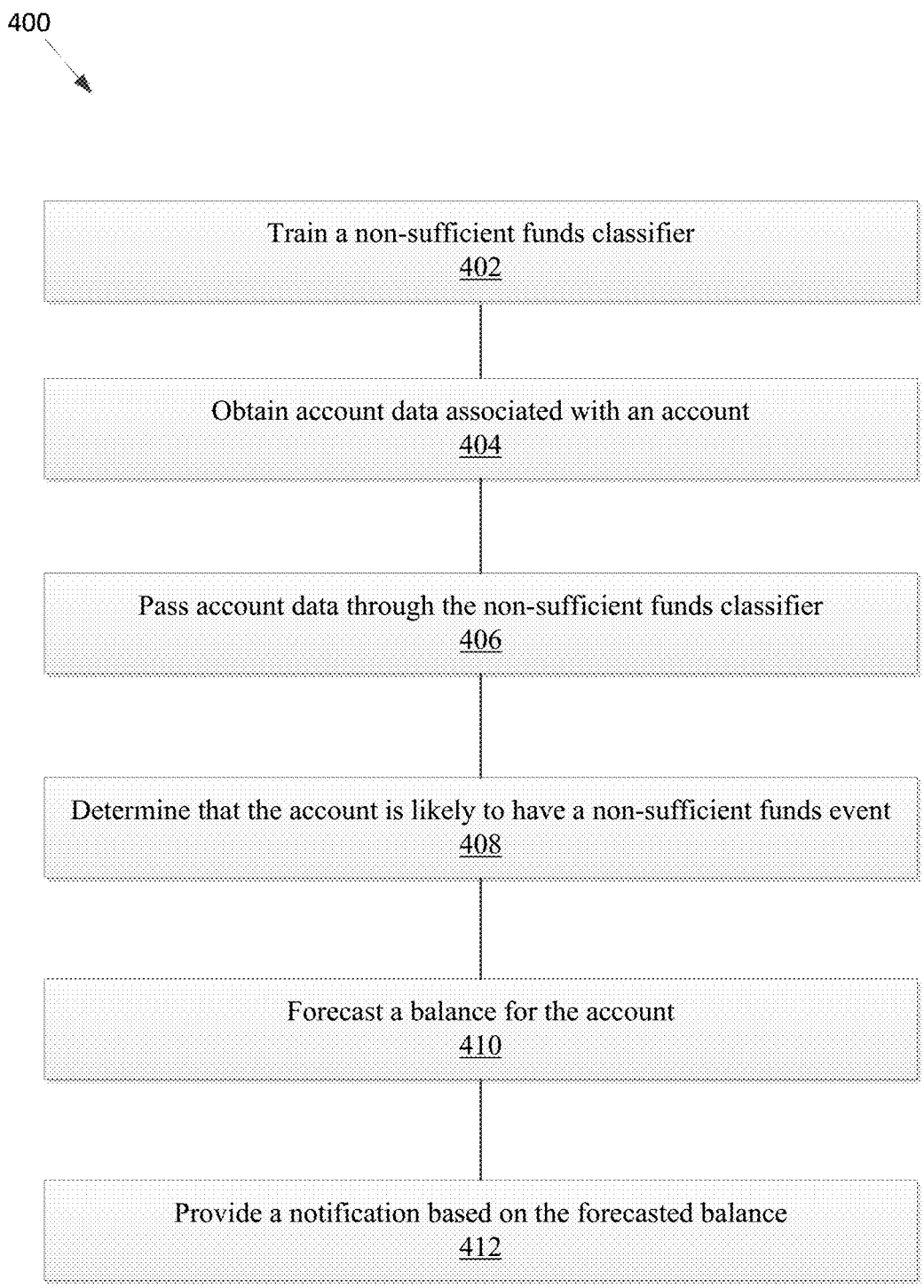
FIG. 4 is a flowchart of an example method in accordance with an example embodiment of the present disclosure.

Operations performed by the client device 150 and the server 160 will be described below. Referring first to FIG. 4, a flowchart showing example operations is illustrated.

FIG. 4 is a flowchart showing operations performed by a server 160. The operations may be included in a method 400 which may be performed by the server 160. For example, computer-executable instructions stored in memory of the server 160 may, when executed by a processor of the server 160, configure the server 160 to perform the method 400 or a portion thereof. For example, such instructions may, when executed by the processor of the server 160, configure the processor of the server 160 to perform the method.

At operation 402, the server 160 may train a machine learning module, such as a classifier. The classifier is used for mapping input data to a specific category. In order to do so, the classifier may be configured to evaluate a plurality of parameters.

In at least some implementations, the classifier may be trained to identify accounts that are likely to fall short of resources. Such accounts may, for example, be referred to as non-sufficient funds accounts and a classifier that is configured to identify such accounts may be referred to as a non-sufficient funds classifier. Falling short of resources may be said to occur when a shortfall event occurs. Shortfall events may include any one or a combination of: having a cheque that was to be drawn from the account returned for non-sufficient funds, having insufficient resources to pay a bill before a due date, having an account balance that falls below a threshold, which may be zero, having an account balance that falls below a non-zero threshold (such as a minimum threshold required to obtain a perk, such as waiver of an account fee, etc.), having a point-of-sale transaction that was to draw funds from the account denied for lack of funds, and/or having the account enter an overdrawn condition. Other conditions may define a shortfall of resources in other implementations. The classifier may be configured to identify accounts that are expected to have a shortfall event. For example, in some implementations, the classifier may be configured to identify accounts that are expected to have a shortfall event within a predetermined period of time (e.g., within the next week, month, etc.).

Training of the classifier may be performed based on a training set. The training set may include historical account data. The training set includes some accounts that have experienced shortfall events and may include some accounts that have not experienced shortfall events. The training set may, in some instances, be pre-marked with indications of a shortfall event. By way of example, the training set may, for an account that experienced a shortfall event, indicate a date of the shortfall event. In some embodiments, the historical account data may be preprocessed by the server 160 prior to training the classifier. During pre-processing, the server 160 may identify shortfall events. Such events may be identified, for example, from the historical account data. For example, the account data may include metadata identifying shortfall events. For example, a transaction listing may be included in the account data and may list past transactions including, for example, transactions that have been denied. For example, point-of-sale transactions that were declined and/or cheques that were returned for non-sufficient funds may be reflected in the transaction listing. During pre-processing, such events may be further flagged for easier identification by the classifier. By way of further example, shortfall events that are associated with the balance falling below a defined threshold may be identified and flagged.

The flagging of shortfall events or the metadata identifying shortfall events may act as a non-sufficient funds indication which indicates whether the associated account is associated with a non-sufficient funds event.

In at least some implementations, during the pre-processing the server 160 may include/exclude certain portions of the transaction listing. For example, events that are deemed too old (e.g., more than a threshold period of time before the shortfall event may be excluded).

During pre-processing, the server 160 may also mark events or other data that correspond to parameters that are used by/considered by the classifier. For example, the parameters may include one or more of: a past non-sufficient funds event; a location indicator identifying a location (e.g., a location of an account holder); an account duration indicating a length of time since the account was opened; a balance (e.g., a balance meeting certain defined criteria which may be based on a threshold); an indication of decrease in income; and an indication of spending in a defined spending category (e.g., the amount of spending on restaurants in a month).

The classifier may be trained based on the training set at operation 402. The training set, which may be the pre-processed training set, may include account data for a plurality of accounts and may include a non-sufficient funds indication for each of the accounts. The non-sufficient funds indication indicates whether the associated account is associated with a non-sufficient funds event. The account data that is passed through the classifier to train the classifier may include transaction listings and may also include other biographical data associated with the account. For example, the biographical data may include a location associated with the account. The location may be a geographical location and may include one or more of a city, state, province, or country. As noted above, some events/criteria associated with the parameters may be marked/flagged during pre-processing and the marked/flagged data may be passed to the classifier during the training.

During the training, the server 160 may determine respective weights for a plurality of parameters. The plurality of parameters may include parameters such as those recited above. For example, the plurality of parameters may include one or more of: a past non-sufficient funds event; a location indicator identifying a location (e.g., a location of an account holder); an account duration indicating a length of time since the account was opened; a balance (e.g., a balance meeting certain defined criteria which may be based on a threshold); an indication of decrease in income; and an indication of spending in a defined spending category (e.g., the amount of spending on restaurants in a month). Other parameters may be used instead of or in addition to the parameters identified above. During testing, it has been determined that one of the most-significant indicators of a future shortfall event is a past shortfall event. Accordingly, a past non-sufficient funds event may be a parameter that is weighted strongly to have a large effect on the output of the classifier.

The classifier may be of a variety of types. The classifier may be supervised. In other implementations, unsupervised classifiers may be used.

After the classifier has been trained, various variables or weights that were determined during the training may be stored. The classifier may then be used to rapidly classify other accounts (i.e., accounts not part of the training set). For example, at operation 404, the server 160 may obtain account data that is not included in the training set. That is, the server may, at operation 406, pass at least some of the account data through the classifier. The classifier may, as noted above, be a non-sufficient funds classifier, which is a machine learning classifier configured to classify the account as either likely to have a non-sufficient funds event or unlikely to have a non-sufficient funds event. To perform such classification, the machine learning classifier may be configured to evaluate a plurality of parameters associated with the account data and the parameters may be the same parameters used in the training. For example, the classifier may consider both a transaction listing and biographical data for each account. In at least some implementations, prior to passing the account data to the classifier, the server may pre-process at least some of the account data. Pre-processing may be performed in the same manner as the pre-processing of the training data. For example, various events/criteria that are associated with the parameters used in the classifying may be identified. For example, the server may identify such parameters as: a past non-sufficient funds event; a location indicator identifying a location (e.g., a location of an account holder); an account duration indicating a length of time since the account was opened; a balance (e.g., a balance meeting certain defined criteria which may be based on a threshold); an indication of decrease in income; and an indication of spending in a defined spending category (e.g., the amount of spending on restaurants in a month).

The classifier may provide a binary output in at least some implementations. For example, the classifier may have outputs that include either an indication that the account is likely to have a non-sufficient funds event or an indication that the account is not likely to have a non-sufficient funds event. If the server determines that the account is not likely to have a non-sufficient funds event, subsequent operations of the method may not be performed. In particular, the forecasting and notification operations described below may not be performed in such a scenario. For example, if the server determines that the account is not likely to have a non-sufficient funds event, it may proceed to perform operation 406 again for account data associated with another account.

If, however, the server 160 determines (at operation 408) that the account is likely to have a non-sufficient funds event, then the server 160 may further evaluate the account. That is, in response to determining that the account is likely to have a non-sufficient funds event, the server 160 may further evaluate the account by, for example, forecasting a balance for the account (operation 410). For example, the server may forecast a future balance for the account. In some embodiments, the server may forecast a balance at a date which is at least a defined period of time in the future. For example, the server may forecast a balance 1 week in the future or 1 month in the future. In some implementations, the server may forecast a balance over a range of time. For example, a balance may be forecasted for each of a plurality dates within a time period. For example, in some implementations, the balance may be forecasted for each date within the time period.

In order to forecast a balance for the account, the server may, for example, identify one or more projected future transfers for the account by identifying a pattern of past transfers associated with the account. Example techniques for identifying a pattern of past transfers will be discussed below and, in particular, in the discussion of FIGS. 5 to 8. Such techniques may be used at operation 410 in order to identify a pattern of transfers for a particular account and then determine one or more future transfers based on such pattern. By way of example, for a particular counterparty that is reflected in the transaction listing for an account, the pattern of transfers may be determined to be monthly transfers. For such a party, a future transfer may be projected based on a last transfer date for that counterparty. For example, if a last transfer occurred on June 10, then it may be expected that the next transfer will occur on July 10.

Other patterns may be determined for other counterparties and/or for other accounts. By way of example, supported patterns may include one or more of: transfers are due monthly, transfers are due weekly, transfers are due yearly, transfers are due monthly but any transfer falling due on a weekend will, instead, be due a next weekday, transfers are due weekly but any transfer falling due on a weekend will, instead, be due on a next weekday, transfers are due yearly but any transfer falling due on a weekend will, instead, be due on a next weekday, transfers are due monthly but any transfer falling due on a weekend or a holiday will, instead, be due a next weekday, transfers are due weekly but any transfer falling due on a weekend or a holiday will, instead, be due on a next weekday, and transfers are due yearly but any transfer falling due on a weekend or a holiday will, instead, be due on a next weekday.

Patterns may be identified independently for multiple counterparties and patterns may be identified for both incoming transfers (e.g., payroll) and outgoing transfers (e.g., bill payments). Upcoming transfers may then be identified for each counterparty independently.

The server may use the patterns to identify a date of a future transfer (i.e., a projected value date of the transfer). The server may also determine a projected value amount for the projected future transfers. For example, the projected value amount may be determined from a last value amount of a transfer with the associated counterparty. By way of example, if the most-recent transfer was for $32.33, then the projected value amount may be determined to be $32.33. In other implementations, the server 160 may consider other transfers instead of or in addition to the most recent transfer with a counterparty to determine the projected value amount for that counterparty. For example, a predetermined number of recent transfers may be used and the server may, for example, determine the projected value amount as an average or a weighted average of the amounts of such recent transfers. Where a weighted average is used, the weightings may be configured to favor more recent transfers over older transfers.

In some implementations, the projected value amount for a particular counterparty may be determined using a pattern analysis or based on a past transfer that is not a most-recent transfer. By way of example, where the counterparty is a utility, such as a gas company or an electric company, value amounts may be based on seasonal factors. For transfers whose amounts may be expected to be seasonal, the server may, in determining a projected value amount for a given time period (e.g., such as for a particular month), make the determination based on the value amount for the same time period in a previous year, such as a most recent year (e.g., such as for the same month last year). In some implementations, the projected value transfer amount may be determined as the value amount for the same time period in the previous year. In some other implementations, the projected value amount may be determined by applying an inflationary (or, in some instances, deflationary) adjustment to the value amount for the same time period last year. The amount of inflation (or deflation as the case may be) may be determined by, for example, comparing the value amounts for recent past time periods to the value amounts for corresponding time periods in the prior year. By way of example, if, on average, recent months tend to be 5% higher than corresponding months in a prior year, then a 5% inflationary adjustment may be applied to value amount for the same time period last year to determine the projected value amount for the current time period.

Once patterns of past transfers are determined and projected future transfers are determined for the various counterparties, the server may determine a forecasted balance by adjusting a current balance based on the one or more projected future transfers. For example, the balance may be adjusted for the inflows (incoming transfers) and outflows (outgoing transfers) of resources. For example, in some cases the forecasted balance may be determined by adjusting the current balance to account for at least one incoming transfer and at least one outgoing transfer.

In some instances, the server may also consider non-recurring transfers when forecasting the balance. For example, the server may adjust the balance based on recent-non recurring spending reflected in the transaction listing. Non-recurring spending is spending that does not follow a defined pattern. For example, spending on groceries, gas, restaurants, etc. may be considered to be non-recurring. In at least some embodiments, the forecasted balance may be determined based, in part, on recent non-recurring spending. For example, typical spending in various categories may be determined and, in some implementations, typical dates associated with such spending may be determined. For example, the server may determine that a particular account holder tends to spend $100 per week on restaurants and that they tend to incur such costs on Saturday nights. In such a scenario, the forecasted balance may assume a $100 weekly charge on Saturday nights.

Conveniently, by using a classified as a coarse filter to identify accounts that have traits that suggest that they may soon experience a non-sufficient funds event and by restricting the forecasting described at operation 410 to accounts that have been flagged as likely to experience a non-sufficient funds event, the method 400 of FIG. 4 may operate to save computer resources such as processing cycles. That is, the described technique may assist in reducing processing resources over an implementation in which the forecasting of operation 410 were performed for all accounts since the forecasting of operation 410 can be considered a more processing-intensive operation than the classification of operation 406.

After the server 160 has forecasted the balance, the server 160 may provide at operation 412, to a client device associated with the account, a notification. The notification may be based on the forecasted balance.

The notification at operation 412 or in any of the other notification operations described herein may be provided, for example, as an electronic message sent to an electronic messaging address associated with the account. In some implementations, the notification may be provided as a device notification which is associated with an on-device application (such as a banking application) but which may be displayed as a message outside of the application's user interface. In at least some implementations, when the notification is initially displayed it may not include secure information. For example, it may only indicate that the user has a message available. In order to view the notification in greater detail including, for example, in order to view secure information, the entity receiving the notification may need to authenticate with the server.

Authentication to the server may be provided, for example, by an on-device application that is associated with the server, such as a banking application. A user may input authentication credentials into the application and the server may receive such authentication credentials or a representation thereof, from the client device 150 via a communications module. The authentication credentials may, for example, include one or more of: a username, a password, a personal identification number (PIN), biometric data such as a representation of a fingerprint, or other data that may be used to verify the identity of an operator of the client device 150. The server 160 identifies an account to which the authentication credentials correspond and determines that the authentication credentials are valid before providing the detailed notification, which may include secure data. The secure data may include, for example, an indication of the future balance.

In at least some implementations, the notification is provided in response to determining that the forecasted balance is expected to fall below a defined threshold. In some implementations, the defined threshold may be zero. That is, the server may notify the client device when the account is expected to run out of resources and/or to have a shortfall/non-sufficient funds event. The notification may, in its detailed form, indicate one or more of: a date when the account is expected to run out of resources, a current balance, dates of projected incoming or outgoing transfers, etc.

The notification may, for example, provide a selectable option to transfer value from another account into the account that is expected to experience the shortfall. A user may, for example, select the selectable option to configure a transfer and transfer parameters may be prepopulated in response. For example, a recipient account parameter which identifies the account that will be receiving the value transferred may be pre-configured to be the account that is expected to experience the shortfall and/or an amount of the transfer may be pre-configured with an amount that exceeds an amount of the shortfall.

The notification may, in at least some implementations, be provided on a date that is determined from the date of a projected future transfer that may be expected to trigger the shortfall event (e.g., cause the forecasted balance to fall below the threshold). For example, the notification may be provided a predetermined number of days before the projected future transfer is expected to occur.

Techniques for identifying patterns of recurring transfers will now be discussed with reference to FIG. 5.

FIG. 5 is a flowchart showing operations performed by a server 160. The operations may be included in a method 500 which may be performed by the server 160. For example, computer-executable instructions stored in memory of the server 160 may, when executed by a processor of the server 160, configure the server 160 to perform the method 500 or a portion thereof. For example, such instructions may, when executed by the processor of the server 160, configure the processor of the server 160 to perform the method.

At operation 502, the server 160 stores a set of candidate rules. The set of candidate rules may define payment cycles. By way of example, the candidate rules may include one or more of following rules: transfers are due monthly; transfers are due weekly; transfers are due yearly; transfers are due monthly but any transfer falling due on a weekend will, instead, be due a next weekday; transfers are due weekly but any transfer falling due on a weekend will, instead, be due on a next weekday; transfers are due yearly but any transfer falling due on a weekend will, instead, be due on a next weekday; transfers are due monthly but any transfer falling due on a weekend or a holiday will, instead, be due a next weekday; transfers are due weekly but any transfer falling due on a weekend or a holiday will, instead, be due on a next weekday; and transfers are due yearly but any transfer falling due on a weekend or a holiday will, instead, be due on a next weekday.

The candidate rules may be stored in local or remote memory associated with the server and the storing of the candidate rules may be included in the method 500 or performed prior to operation of the method 500.

At operation 504, the server identifies, from a transaction history for an account, an actual set of transfers made to or with a first recipient, which may also be referred to as a first counterparty. The transaction history may also be referred to as a transaction listing or transfer listing. The transaction listing is a list of past transactions/transfers. The transaction listing may include incoming and outgoing transactions, for example. In identifying the actual set of transfers, the server may utilize metadata in the transaction listing. The metadata may, for example, include a counterparty identifier and the identification may involve compiling a list of all transfers that have a common counterparty identifier.

At operation 506, the server 160 identifies a first reference transfer from the set of actual transfers. For example, the server 160 may select one of the transfers in the actual set of transfers made to or with the first recipient as the first reference transfer. In at least some implementations, the first reference transfer may be identified as an oldest transfer in the set of actual transfers. In other implementations, the first reference transfer may be identified as a transfer that is the oldest transfer within a defined time period measured from a current date. Other methods of identifying the first reference transfer may also be used.

At operation 508, the server 160 may, for each of at least a plurality of candidate rules in the set of candidate rules, identify, based on the first reference transfer, an expected set of transfers for that candidate rule. For example, the server 160 may use the first reference transfer as a starting point and determine subsequent dates on which transfers should be made based on the various candidate rules.

Next, at an operation 510, the server 160 may identify one of the candidate rules as a closest rule for the actual set of transfers. For example, the server may evaluate each of the plurality of candidate rules for which the expected set of transfers has been determined. Such evaluation may be made by determining a distance metric between transfers in the expected set of transfers for that one of the candidate rules and transfers in the actual set of transfers. For example, in some implementations, each of the transfers in the actual set of transfers may be associated with an actual date and each of the transfers in the expected sets of transfers may be associated with an expected date and the distance metric may be based on a comparison of actual dates and expected dates. For example, the distance metric for a candidate rule may be determined as an average of the difference between respective dates in the actual set of transfers and the expected set of transfers for that candidate rule. For example, beginning with the first date of a transfer in the expected set of transfers, a difference may be determined between that date and a corresponding date in the actual set of transfers and a difference may also be determined between each subsequent date in the expected set of transfers and each subsequent date in the actual set of transfers. Based on such distances, the distance metric may then be determined, for example, as an average of the distances.

Accordingly, in at least some implementations, each of the transfers in the actual set of transfers is associated with an actual date and each of the transfers in the expected sets of transfers is associated with an expected date and the distance metric may be based on a comparison of actual dates and expected dates.

Once the distances metric is determined, the server 160 may select one of the candidate rules as the closest rule based on the distance metrics. For example, the server 160 may attempt to minimize the distance metric by selecting the candidate rule having the smallest distance metric.

In some implementations, value of transfers may be considered instead of or in addition to date. For example, in at least some implementations, each of the transfers in the actual set of transfers may be associated with a value and each of the transfers in the expected set of transfers may be associated with a value and the distance metric may be determined based on the value. The value may be an amount or quantity of resources and the value may be expressed, for example, in units of currency, such as dollars, pounds, Euros, etc.

Where the distance metric is configured to consider value, the difference between a value represented in transfer in the expected set of transfers for a candidate rule and the value represented in a corresponding transfer in the actual set of transfers for the candidate rule may be considered in order to determine the distance metric. In such implementations, a candidate rule may be selected which minimizes such a distance metric. That is, a candidate rule that accurately predicts values may be selected. Where both value and date are considered, a candidate rule may be selected to jointly minimize a value-based distance metric and a date-based distance metric. Respective weightings for these distance metrics may be predefined so as to control the relative significance of each of these distance metrics. In at least some implementations, root mean square error minimization may be performed in order to select the appropriate candidate rule.

At an operation 512, the server 160 is configured to identify a future expected transfer based on the identified one of the candidate rules. That is, once a candidate rule which fits the pattern of transfers with a counterparty is identified, that candidate rule may be used to identify future expected transfers with that same counterparty. For example, a next expected transfer may be determined based on, for example, a most recent one of the transfers in the set of actual transfers. For example, if the rule indicates that transfers are to occur monthly and the most-recent transfer occurred on June 11, then the server 160 may determine that a transfer will occur on July 11.

In some implementations, the server 160 may identify a value associated with the future expected transfer. For example, the server 160 may identify an amount of resources that is expected to be transferred in the future expected transfer. The value may be identified based on, for example, the identified candidate rule and a value of at least one of the transfers in the actual set of transfers. For example, in at least some implementations, the most recent transfer in the actual set of transfers may be used.

Next, at an operation 514, the server 160 provides a notification to a client device associated with the account of the future expected transfer. For example, the server may notify the client device associated with an account prior to the future expected transfer. The notification may, for example, identify a value associated with an upcoming transfer and/or a date associated with an upcoming transfer. That is, identifying a future expected transfer may include identifying a value associated with the future expected transfer and the notification may identify the value. For example, the server 160 may provide a message to the client device indicating that a transfer of $32.45 appears to be required by July 11.

In at least some implementations, the notification may indicate a projected future balance. For example, based on the identified candidate rule, forecasting may be performed. The forecasting may be performed, for example, in the manner described above with reference to operation 410 of the method 400. For example, a current balance may be adjusted to account for projected future transfers and the projected future transfers may be determined by identifying candidate rules using the techniques of FIG. 5, for example. By way of example, a balance may be forecasted for a predetermined period of time in the future such as, for example, one month from the current date.

The notification may, in at least some implementations, be provided at or near a date associated with the future expected transfer. For example, the future expected transfers may be associated with a date and the notification may be provided in response to determining that the date of the future expected transfer is within a defined proximity of the current date or, put differently, in response to determining that the current date is within a predetermined proximity of the date of the future expected transfer. The predetermined proximity may, for example, be defined in terms of a number of days or a number of business days.

The notification provided at operation 514 may, for example, include a selectable option to initiate a transfer. For example, the notification may include a selectable link to, for example, transfer value to the first recipient. In at least some implementations, selection of the selectable option (using an input interface of the client device) may cause the transfer parameters associated with a transfer to be pre-populated. For example, a recipient identifier may be pre-populated to identify the first recipient. By way of further example, a date associated with the transfer may be configured with a date that is on, or within a predetermined period of time, of a date associated with the future expected transfer. By way of further example, a value associated with the transfer, which defines an amount of resources being transferred, may be pre-populated based on the value associated with the future expected transfer.

As described above with reference to FIG. 4, the notification may be provided in parts. For example, a notification may initially exclude secure data and the secure data may only be provided after the recipient of the notification has authenticated with the server 160.

The techniques described with reference to the method of FIG. 5 of identifying a pattern/candidate rule may also be used in other methods described herein such as, for example, the method 400 of FIG. 4 and, in particular, operation 410 of the method 400.

Figure 6A:
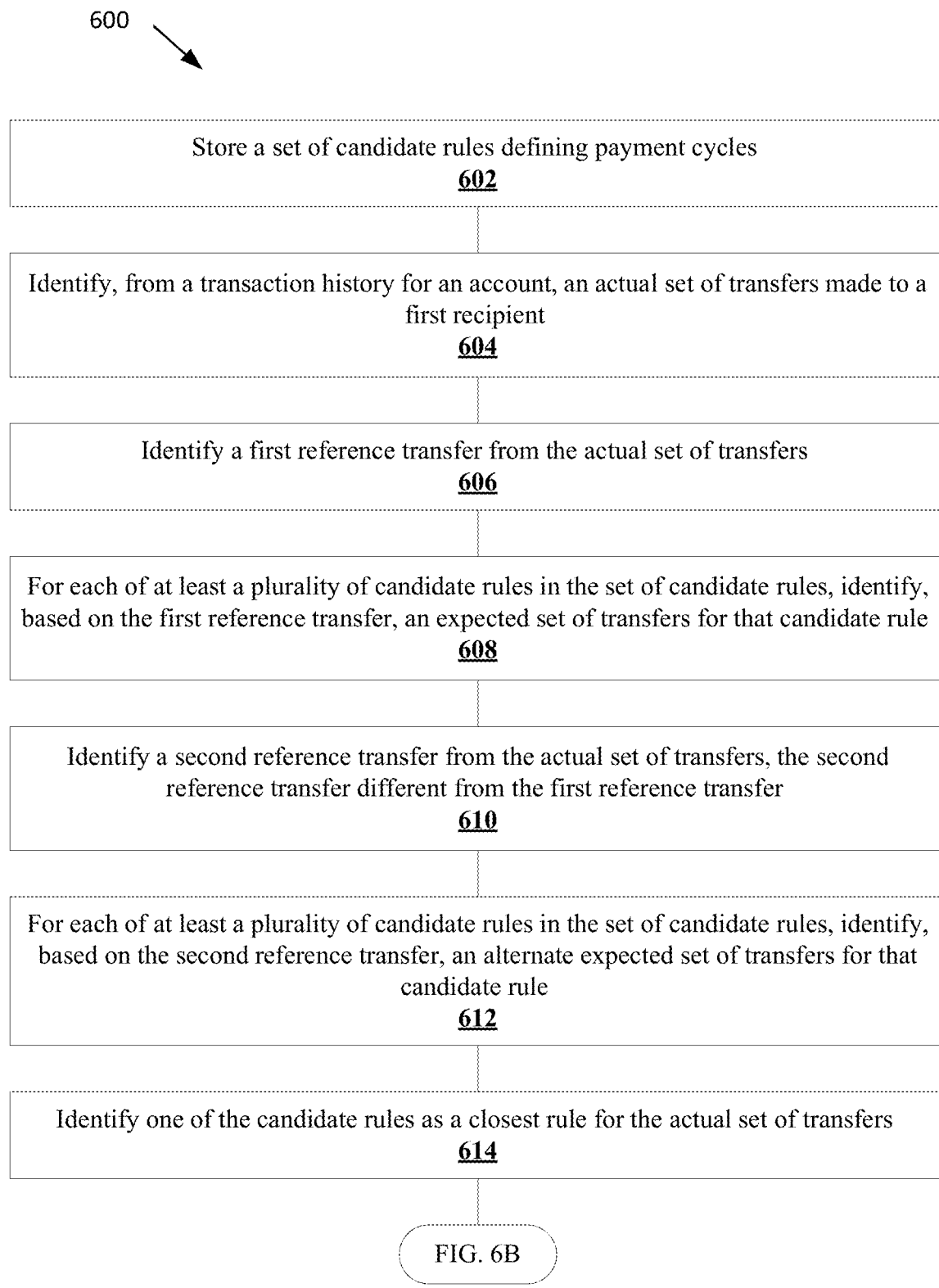

Reference will now be made to FIGS. 6A and 6B which illustrate a method 600.

FIGS. 6A and 6B are flowcharts showing operations performed by a server 160. The operations may be included in a method 600 which may be performed by the server 160. For example, computer-executable instructions stored in memory of the server 160 may, when executed by a processor of the server 160, configure the server 160 to perform the method 600 or a portion thereof. For example, such instructions may, when executed by the processor of the server 160, configure the processor of the server 160 to perform the method 600.

The method 600 includes many operations previously described above with reference to the method 500 of FIG. 5 and the description of such operations will not be repeated in full but will, instead, by made with reference to corresponding operations of FIG. 5. For example, at operation 602, the server 160 may store a set of candidate rules. Operation 602 may be performed as described above with reference to operation 502 of the method 500 of FIG. 5.

At operation 604, the server 160 may identify, from a transaction history for an account, an actual set of transfers made to a first recipient. Operation 604 may be performed as described above with reference to operation 504 of the method 500 of FIG. 5.

At operation 606, the server 160 may identify a first reference transfer from the actual set of transfers. Operation 606 may be performed in the manner described above with reference to operation 506 of the method 500 of FIG. 5.

At operation 608, the method may include, for each of at least a plurality of candidate rules in the set of candidate rules, identifying, based on the first reference transfer, an expected set of transfers for that candidate rule. Operation 608 may be performed in the manner described above with reference to operation 508 of the method 500 of FIG. 5.

Next, at an operation 610, the method may include, identifying a second reference transfer from the actual set of transfers. The second reference transfer may be different from the first reference transfer. For example, it may be that the expected set of transfers that was determined based on the candidate rule and the first reference transfer did not well align with the actual set of transfers because the first reference transfer was a poorly selected reference transfer. In order to address this possibility, a second reference transfer may also be selected at operation 610 and, at operation 612, the server 160 may, for each of at least a plurality of candidate rules in the set of candidate rules, identify, based on the second reference transfer, an alternate expected set of transfers for that candidate rule. That is, the alternate expected set of transfers may be determined using the second reference transfer as a starting point.

Next, at an operation 614, the method 600 may include identifying one of the candidate rules as a closest rule for the actual set of transfers. Operation 614 may be performed in the manner described above with reference to operation 510 except that identifying one of the candidate rules as the closest rules for the set of transfers may further include evaluating each of the plurality of candidate rules by determining a further distance metric between transfers in the alternate expected set of transfers for that one of the candidate rules and transfers in the actual set of transfers and the selection of one of the candidate rules as the closest rule may be further based on the further distance metrics. Put differently, each of the candidate rules is evaluated using different reference dates as a starting point.

In some implementations, the server 160 may request confirmation from a client device associated with an account of a candidate rule before using that candidate rule. Accordingly, the server 160 may, at operation 616, send a message to the client device requesting confirmation of the identified candidate rule or the future expected transfer. The server may receive back a message confirming the candidate rule before proceeding to an operation 618.

At the operation 618, the server identifies a future expected transfer based on the identified one of the candidate rules. Operation 618 may be performed in the manner described above with reference to operation 512 of the method 500 of FIG. 5.

In some implementations, the server 160 may request confirmation from a client device associated with an account of the future expected transfer. For example, the server may, at operation 620, send a message to the client device requesting confirmation of the future expected transfer. For example, the message may request the client device to confirm a date and/or a value associated with the future expected transfer.

Operation 620 may be performed, for example, as an alternative to operation 616. The server may receive back a message confirming the future expected transfer before proceeding to an operation 622. If, instead, the server receives back a message indicating that the value or date of the future expected transfer is different, then the server may attempt to determine if a different candidate rule be better suited.

At operation 622, the server 160 may provide a notification to a client device associated with the account of the future expected transfer. Operation 622 may be performed in the manner described above with reference to operation 514 of the method 500 of FIG. 5.

Next, at an operation 624, the method 600 may include, after a predetermined period of time has elapsed following the identification of one of the candidate rules, re-identifying one of the candidate rules as the closest rule for the actual set of transfers by evaluating each candidate rule based on recent transfers. The recent transfers include at least some transfers occurring after a previous identification of one of the candidate rules. That is, after more transfers have occurred with the first recipient, the set of candidate rules may, again, be re-evaluated to ensure that the selected candidate rule is still a best fit for the transaction listing which now includes additional transfers.

In some instances, a transaction listing for an account may not include a sufficient number of transfers with a particular counterparty to identify a pattern of transfers for that counterparty. For example, when a customer changes cellular service providers, a first transfer with the new provider may be reflected in the transaction listing but the single transfer may not, in itself, allow for pattern identification. Referring now to FIG. 7, a flowchart shows example operations which may, for example, provide pattern identification in scenarios where an account has a short transfer history with a counterparty.

FIG. 7 is a flowchart showing operations performed by a server 160. The operations may be included in a method 700 which may be performed by the server 160. For example, computer-executable instructions stored in memory of the server 160 may, when executed by a processor of the server 160, configure the server 160 to perform the method 700 or a portion thereof. For example, such instructions may, when executed by the processor of the server 160, configure the processor of the server 160 to perform the method 700.

At operation 702, the method 700 may include identifying, from a set of accounts each having a transfer listing (which, may also be referred to herein as a transaction listing) that includes a plurality of transfers with a first counterparty, a first rule matching a pattern of transfers associated with the first counterparty. The set of accounts may include account data for a plurality of bank accounts which include transfers with a particular counterparty, "the first counterparty". The transfers may be or include incoming transfers, such as, for example, a receipt of value associated with payroll processing, and/or may include outgoing transfers such as, for example, an external transfer made to, for example, pay a bill.

The server 160 may, as described above with reference to operations 502 and 602 of FIGS. 5 and 6, store a set of candidate rules that define payment cycles. Such rules may include, for example, at least the first rule and a second rule. The first rule is a rule that best matches the pattern of transfers with the counterparty across all of the accounts in the set of accounts. For example, the server 160 may perform, for each account in the set of accounts, the operations 504 to operation 510 of the method 500 and/or 604 to 614 of the method 600 and the first counterparty will act as the "first recipient" as described above for such operations in order to identify the closest candidate rule with respect to each account. Then, the candidate rule that was identified as the closest rule for the most accounts in the set of accounts may be selected as the "first rule" in operation 702. That is, the first rule is the rule that is most frequently used for the first counterparty across the set of accounts.

Various candidate rules may be included in the set of candidate rules from which the first rule is identified. For example, the rules may include one or more of: transfers are due monthly; transfers are due weekly; transfers are due yearly; transfers are due monthly but any transfer falling due on a weekend will, instead, be due a next weekday; transfers are due weekly but any transfer falling due on a weekend will, instead, be due on a next weekday; transfers are due yearly but any transfer falling due on a weekend will, instead, be due on a next weekday; transfers are due monthly but any transfer falling due on a weekend or a holiday will, instead, be due a next weekday; transfers are due weekly but any transfer falling due on a weekend or a holiday will, instead, be due on a next weekday; and transfers are due yearly but any transfer falling due on a weekend or a holiday will, instead, be due on a next weekday.

The set of accounts that are used to identify the first rule may represent account data for a plurality of actual customers. For example, the account may be a bank account and the customers may be customers of the bank. For a given counterparty, it may be expected that the many accounts will follow a common transfer schedule. For example, transfers representing a payment due to a particular cellular service provider may be due, for example, monthly and that cellular service provider may have a policy that any transfer falling due on a weekend will, instead, be due on a next weekday. Accordingly, by identifying the most common transfer schedule for the first counterparty, this transfer schedule (i.e., the transfer schedule defined by such a rule) may be used for notification generation for another account that is not in the set when such an account has not yet built up a sufficient transfer history with the first counterparty for accurate prediction of the payment schedule from that other account alone.

At operation 704, the server 160 may identify, for a first account not included in the set of accounts, an initial transfer with the first counterparty represented in a transfer listing for that account. The transfer listing for that account may not have a sufficient number of transfers with the first counterparty to accurately predict the transfer schedule for the transfer listing alone. For example, the transfer listing for that account may not include a second transfer with the first counterparty.

Since the first account does not include a sufficient transfer history with the first counterparty to predict the transfer schedule that is used by the first counterparty, the server 160 may use the first rule (i.e., the rule identified from other accounts at operation 702 for the first counterparty) for predictions involving the first counterparty and the first account. For example, at operation 706, the method 700 may include identifying one or more projected future transfers for the first account based on a date associated with the initial transfer and the first rule. For example, the date may be the date of the initial transfer with the first counterparty represented in the transfer listing for the first account. Using the first rule, the server 160 may then predict when a next transfer is due and/or expected to occur. For example, if the rule indicates that the transfers are to occur monthly, then the server may select a date which is one month from the date of the initial transfer.

In at least some implementations, the server 160 may determine a projected value amount for the projected future transfer(s). For example, the server 160 may, in at least some implementations, determine the projected value amount as the value amount for the initial transfer. That is, the server 160 may assume that whatever amount was transferred during the initial transfer will be approximately the same as whatever amount will be required to be transferred for the projected future transfer. Other techniques for determining the projected value amount may also be used. For example, in some implementations, the server 160 may perform some pattern-based analysis such as, for example, using techniques described above with reference to, for example, operation 410 of the method 400 of FIG. 4. Such pattern matching may be performed based on, for example, the accounts in the set of accounts.

In at least some implementations, the server 160 may, at operation 708, provide a notification to a client device associated with the first account based on the first rule.

The notification may be provided, for example, as an electronic message sent to an electronic messaging address associated with the first account. In some implementations, the notification may be provided as a device notification which is associated with an on-device application (such as a banking application) but which may be displayed as a message outside of the application's user interface. In at least some implementations, when the notification is initially displayed it may not include secure information. For example, it may only indicate that the user has a message available. In order to view the notification in greater detail including, for example, in order to view secure information, the entity receiving the notification may need to authenticate with the server.

Authentication to the server may be provided, for example, by an on-device application that is associated with the server, such as a banking application. A user may input authentication credentials into the application and the server may receive such authentication credentials or a representation thereof, from the client device 150 via a communications module. The authentication credentials may, for example, include one or more of: a username, a password, a personal identification number (PIN), biometric data such as a representation of a fingerprint, or other data that may be used to verify the identity of an operator of the client device 150. The server 160 identifies an account to which the authentication credentials correspond and determines that the authentication credentials are valid before providing the detailed notification, which may include secure data. The secure data may include, for example, an indication of the future balance.

The notification may take various forms. For example, the notification may, in some implementations, be a notification that is based on a forecasted balance. For example, the server may forecast a balance as described above with reference to operation 410 of the method 400. The forecasting may be based on, for example, the one or more projected future transfers for the first account that were identified at operation 706.

In at least some implementations, the notification is provided in response to determining that the forecasted balance is expected to fall below a defined threshold. In some implementations, the defined threshold may be zero. That is, the server may notify the client device when the account is expected to run out of resources and/or to have a shortfall/non-sufficient funds event. The notification may, in its detailed form, indicate one or more of: a date when the account is expected to run out of resources, a current balance, dates of projected incoming or outgoing transfers, etc.

The notification may, for example, provide a selectable option to transfer value from another account into the account that is expected to experience the shortfall. A user may, for example, select the selectable option to configure a transfer and transfer parameters may be prepopulated. For example, a recipient account parameter which identifies the account that will be receiving the value transferred may be pre-configured to be the account that is expected to experience the shortfall and/or an amount of the transfer may be pre-configured with an amount that exceeds an amount of the shortfall.

The notification may, in at least some implementations, be provided on a date that is determined from the date of a projected future transfer that may be expected to trigger the shortfall event (e.g., cause the forecasted balance to fall below the threshold). For example, the notification may be provided a predetermined number of days before the projected future transfer is expected to occur.

The notification may take other forms. For example, the notification may be a notification of an upcoming transfer such as, for example, a notification indicating that a transfer to the first counterparty is due soon. Such a notification may serve as a reminder to the customer to ensure that they configure a transfer to the first counterparty prior to a payment due date. The notification may, for example, include a selectable option to initiate a transfer. For example, the notification may include a selectable link to, for example, transfer value to the first recipient. In at least some implementations, selection of the selectable option (using an input interface of the client device) may cause the transfer parameters associated with a transfer to be pre-populated. For example, a recipient identifier may be prepopulated to identify the first recipient. By way of further example, a date associated with the transfer may be configured with a date that is on, or within a predetermined period of time, of a date associated with the projected future transfer. By way of further example, a value associated with the transfer, which defines an amount of resources being transferred, may be pre-populated based on the value associated with the projected future transfer.

Next, at an operation 710, the server may detect one or more further transfers with the first counterparty from the transfer listing for the first account. Detecting one or more further transfers with the first counterparty from the transfer listing for the first account may include determining that the first account includes at least a threshold number of transfers with the first counterparty. The threshold may be a threshold which is sufficient to determine a pattern. For example, in an implementation the threshold may be four though other thresholds may be used.

In at least some implementations, in order for the server 160 to determine that the first account includes a sufficient number of transfers to determine a pattern, the server 160 may only include recent transfers; for example, transfers within a threshold period of time of the current date.

After the server 160 determines that the first account has a sufficient number of transfers with the first counterparty, the server may, at operation 712, identify a second rule that matches a pattern of payment cycles represented in the transfer listing for the first account. That is, the transfers with the counterparty in the first account itself may now be used to determine which of the rules, in the set of candidate rules, best matches the pattern of transfers. The determination of the second rule may be made based on the further transfers with the first counterparty (i.e., the transfers identified at operation 710) and the initial transfer with the first counterparty (i.e., the transfer identified at operation 704). For example, the server 160 may determine, based on the one or more further transfers and the initial transfer that a second rule matches a pattern defined by the further transfers and the initial transfers better than the first rule.

The candidate rules that are used at operation 712 to select the second rule may be the same set of candidate rules that are used at operation 702 to select the first rule and the techniques for matching may be as described above. For example, operations 504 to 510 of the method 500 of FIG. 5 and/or operations 604 to 614 of the method 600 of FIG. 6 may be performed based on account data for the first account in order to identify the closest candidate rule.

In some implementations, operation 712 is performed in response to determining that the first account includes at least the threshold number of transfers. For example, once the threshold number of transfers with the counterparty that is sufficient to determine a pattern is reached, operation 712 may be performed to determine that the second rule matches a pattern defined by the further transfers and the initial transfers better than the first rule.

Operation 712 illustrates a scenario in which the server determines that the second rule is better than the first rule. In other instances, it may be that the server, after identifying a rule based on the transfers with the first counterparty in the first account, determines that the first rule remains the closest rule. In such circumstances, operation 712 may include, for example, verifying, based on the one or more further transfers and the initial transfer that the first rule is a closest rule for the first account.

After a rule has been selected based on the actual transfers for the first account (i.e., after operation 712 has been performed), subsequent notifications that are based on projected future transfers with the first counterparty may be based on the rule identified at operation 712 as the best rule. For example, if the server 160, at operation 712, determines that a second rule is better than the first rule, then notifications that are based on projected future transfers with the first counterparty may be based on the second rule. Accordingly, at operation 714, the server 160 may provide a notification to a client device associated with the first account based on the second rule.

The notification may be of a type described above with reference to operation 708. For example, the notification may be a notification of an upcoming projected future transfer, of a balance, of a projected shortfall, etc.

The notification may be provided in a manner described above with reference to operation 708.

In some implementations, in providing the notification, the server 160 may identify one or more projected future transfers for the first account based on the second rule. Such identification may be performed in the manner described above with reference to operation 706 and/or as described above with reference to operation 512 of the method 500. For example, a most recent one of the further transfers may be used as a reference date and a date of a projected future transfer may be determined based on the second rule and the reference date.

In some implementations, the server 160 may, at operation 714, determine a forecasted balance. The forecasted balance may be determined, for example, as described above with reference to operation 410 of the method 400. For example, the forecasted based may be determined by adjusting a current balance based on the one or more projected future transfers. Then, in at least some implementations, the server may provide the notification based on the forecasted balance. For example, the the notification may a notification of the projected future transfer(s) and/or of the forecasted balance.

The method 700 may be varied. By way of example, in some variations of the method 700, operation 702 may be performed after operation 704. For example, when a transfer with the first counterparty is identified in the transfer listing for the first account (at operation 704), the server 160 may then identify other accounts that are to be included in the set of accounts used for identifying the first rule matching the pattern of transfers. For example, the server 160 may identify a plurality of accounts that each include at least a threshold number of transfers made with the first counterparty. In at least some implementations, the server 160 may identify a plurality of accounts that each include at least a threshold number of transfers made with the first counterparty during a threshold period of time. For example, the server 160 may identify accounts that each have at least three (3) transfers with the first counterparty during a three(3) month period of time. In some implementations, the server may attempt to identify at least a threshold number of accounts (e.g., 1000 accounts). In at least some implementations, the accounts that are identified for inclusion within the first set of accounts are identified based on some other criteria. For example, in at least some implementations, the accounts in the set of accounts are identified based on a location. For example, accounts that are in a geographic region that is associated with the first account may be identified. By way of example, the accounts may be selected so as to be in the same city, province, state and/or country as the first account since transfer schedules may be, in some instances, based on local norms.

Reference will now be made to FIGS. 8A and 8B which illustrate, in flowchart form, a further method 800 that is a variation of the method 700. The method 800 may be used to improve the speed at which the server 160 is able to identify the second rule and/or to reduce processing cycles involved in identifying the second rule.

The method 800 includes many operations in common with the method 700 of FIG. 7. Description of these operations will not be repeated at length and will instead be made through reference to corresponding operations of the method 700 of FIG. 7. The method 800 incudes, for example, at operation 802, identifying, from a set of accounts each having a transfer listing that includes a plurality of transfers with a first counterparty, a first rule matching a pattern of transfers associated with the first counterparty. Operation 802 may be performed, for example, in a manner that is substantially similar to operation 702 of the method 700 of FIG. 7. However, the server 160, in performing operation 802, rank a plurality of rules in a candidate rule set based on frequency of use in the set of accounts. For example, the server may rank all candidate rules based on frequency of use or may, for example, rank only a top threshold number of candidate rules. The first rule may be a most-frequently used rule and a second rule may be a second-most frequently used rule.

Accordingly, rather than simply selecting the top rule, the server may evaluate how common other rules are and record data (which may be referred to as ranking data) indicating frequency of use.

Next, operations 804 to 810 may be performed as described above with reference to operation 704 to 710 of the method 700 of FIG. 7 respectively.

Next, at an operation 812, the server 160 may, prior to prior to determining (at operation 814) that the second rule matches a pattern defined by the further transfers and the initial transfers better than the first rule, identify the second rule as a second most-frequently used rule in the candidate rule set based on the ranking. That is, the server may retrieve the ranking data. Then, at operation 814, the ranking data may be used. For example, the server may evaluate candidate rules one by one in the order of the ranking and, in at least some implementations, may only evaluate a candidate rules with a sufficiently high rank. For example, candidate rules having a frequency of use of zero (i.e., rules that appear to never have been used for a counterparty) may not be used.

The operation 814 may be performed in the manner described above with reference to operation 812 but it may, for example, be performed in response to the identifying of the second rule at operation 812. For example, the server may determine a distance metric for the first rule based on the account data for the first account and may then (at operation 812) determine that the second rule is the second most frequently used rule based on the ranking data and so the server may then determine the distance metric for the second rule based on the account data for the first account. If the second rule has a better distance metric than the first rule, the second rule will be selected.

In some implementations, the server 160 may request confirmation of the second rule. For example, at operation 816, the server may send a message to the client device requesting confirmation of the second rule. The message may, for example, identifying the second rule and identify the first counterparty. Next, at an operation 818, the server 160 receives, via a communication subsystem, a confirmation of the second rule. After receiving such confirmation, the server may use the second rule.

The message may also include a selectable option to select a different one of the candidate rules for the counterparty. In response to receiving such a selection, the server may begin to use the selected different one of the candidate rules.

Next, at operation 820, a notification is provided to the client device as described above with reference to the operation 714 of the method 700 of FIG. 7.

The methods 700 and 800 may be capable of variation. For example, operations 816 and 818 may be performed without, for example, the ranking features of the method 800 or, alternatively, the ranking features of the method 800 may be performed without, for example, the confirmation aspects of operations 8167 and 818.

Furthermore, in at least some implementations, during operation 802 (or operation 702 as the case may be), the server 160 may, based on the ranking, determine a subset of candidate rules. The subset of candidate rules may exclude candidate rules that are infrequently used. Infrequency may be determined based on a threshold which may, for example be based on a frequency threshold (e.g., a candidate rule must have been used at least once) or based on a relative rank with respect to other candidate rules (e.g., a candidate rule must have a rank that is at least in the top five for all candidate rules to be included). In at least some such implementations, when a second rule is determined at operation 814 or 712 as the case may be, the determination may be based on the subset of candidate rules. For example, only the candidate rules in the subset of candidate rules may be evaluated. Put differently, at least one candidate rule that is in the set of candidate rules used at operations 802/702 but that is excluded from the subset of candidate rules determined at operations 802/702 is not evaluated. In such implementations, during operations 814/712, the server 160 attempts to identify the closest one of the candidate rules in the subset based on the account data for the first account (such as the initial and further transfers with the counter-party).

Variations of the embodiments described herein are possible. For example, while many of the notifications described herein may have been described as displayed notifications (i.e., notifications that are configured for display via a display module), in other implementations the notifications may be configured for output on an output module of another type. For example, in some implementations, the audible notifications may be used. By way of example, in one implementation, the client device 150 may be a smart speaker and the notification may be provided audibly via a speaker.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing system comprising:
 a communications module;
 a processor coupled to the communications module; and
 a memory storing processor-executable instructions which, when executed, configure the processor to:
 train a non-sufficient funds classifier based on a training set, the training set including first account data for a plurality of accounts and a non-sufficient funds indication for each of the accounts, the non-sufficient funds indication indicating whether an associated account is associated with a non-sufficient funds event;
 obtain second account data associated with an account not included in the training set;
 pass at least some of the second account data through the non-sufficient funds classifier, the non-sufficient funds classifier being a machine learning binary classifier that is configured to classify the account not included in the training set as either likely to have a non-sufficient funds event or unlikely to have the non-sufficient funds event, based on an evaluation of a plurality of parameters associated with the second account data, wherein the plurality of parameters include one or more of: a location indicator identifying a location; an account duration indicating a length of time since the account not included in the training set was opened; and an indication of spending in a defined spending category;
 receive a binary output from the machine learning binary classifier indicating that the account not included in the training set is likely to have the non-sufficient funds event;
 in response to receiving the binary output indicating that the account not included in the training set is likely to have the non-sufficient funds event, forecast a balance for the account not included in the training set, wherein forecasting the balance for the account not included in the training set includes:
 identifying one or more projected future transfers for the account not included in the training set by identifying a pattern of past transfers associated with the account not included in the training set; and
 determining a forecasted balance by adjusting a current balance based on the one or more projected future transfers;
 provide, to a client device associated with the account not included in the training set, a notification based on the forecasted balance, the notification including a selectable option to transfer value from another account;
 receive, from the client device associated with the account not included in the training set, a request to transfer value from the another account; and
 transfer value from the another account into the account not included in the training set.

2. The computing system of claim 1, wherein training comprises determining respective weights for the plurality of parameters.

3. The computing system of claim 1, wherein the plurality of parameters include one or more of:
 a past non-sufficient funds event;
 a balance; and
 an indication of decrease in income.

4. The computing system of claim 1, wherein the notification is provided in response to determining that the forecasted balance is expected to fall below a defined threshold.

5. The computing system of claim 4, wherein the defined threshold is zero.

6. The computing system of claim 1, wherein the one or more projected future transfers include at least one incoming transfer and at least one outgoing transfer.

7. The computing system of claim 1, wherein the second account data passed through the machine learning binary classifier includes a transaction listing.

8. The computing system of claim 1, wherein the second account data passed through the machine learning binary classifier includes biographical data.

9. A method of notifying of a predicted condition, the method comprising:
 training a non-sufficient funds classifier based on a training set, the training set including first account data for a plurality of accounts and a non-sufficient funds indication for each of the accounts, the non-sufficient funds indication indicating whether an associated account is associated with a non-sufficient funds event;
 obtaining second account data associated with an account not included in the training set;
 passing at least some of the second account data through the non-sufficient funds classifier, the non-sufficient funds classifier being a machine learning binary classifier that is configured to classify the account not included in the training set as either likely to have a non-sufficient funds event or unlikely to have the non-sufficient funds event, based on an evaluation of a plurality of parameters associated with the second account data wherein the plurality of parameters include one or more of: a location indicator identifying a location; an account duration indicating a length of time since the account not included in the training set was opened;

and an indication of spending in a defined spending category;

receiving a binary output from the machine learning binary classifier, the binary output indicating that the account not included in the training set is likely to have a non-sufficient funds event;

in response to receiving the binary output indicating that the account not included in the training set is likely to have the non-sufficient funds event, forecasting a balance for the account not included in the training set, wherein forecasting the balance for the account not included in the training set includes:

identifying one or more projected future transfers for the account not included in the training set by identifying a pattern of past transfers associated with the account not included in the training set; and determining a forecasted balance by adjusting a current balance based on the one or more projected future transfers;

providing, to a client device associated with the account not included in the training set, a notification based on the forecasted balance, the notification including a selectable option to transfer value from another account;

receiving, from the client device associated with the account not included in the training set, a request to transfer value from the another account; and transferring value from the another account into the account not included in the training set.

10. The method of claim 9, wherein training comprises determining respective weights for the plurality of parameters.

11. The method of claim 9, wherein the plurality of parameters include one or more of:
a past non-sufficient funds event;
a balance; and
an indication of decrease in income.

12. The method of claim 9, wherein the notification is provided in response to determining that the forecasted balance is expected to fall below a defined threshold.

13. The method of claim 12, wherein the defined threshold is zero.

14. The method of claim 9, wherein the one or more projected future transfers include at least one incoming transfer and at least one outgoing transfer.

15. The method of claim 9, wherein the second account data passed to through the machine learning binary classifier includes a transaction listing.

16. A non-transitory computer-readable storage medium comprising processor-executable instructions which, when executed, configure a processor to:

train a non-sufficient funds classifier based on a training set, the training set including first account data for a plurality of accounts and a non-sufficient funds indication for each of the accounts, the non-sufficient funds indication indicating whether an associated account is associated with a non-sufficient funds event;

obtain second account data associated with an account not included in the training set;

pass at least some of the second account data through the non-sufficient funds classifier, the non-sufficient funds classifier being a machine learning binary classifier that is configured to classify the account not included in the training set as either likely to have a non-sufficient funds event or unlikely to have the non-sufficient funds event, based on an evaluation of a plurality of parameters associated with the second account data, wherein the plurality of parameters include one or more of: a location indicator identifying a location; an account duration indicating a length of time since the account not included in the training set was opened; and an indication of spending in a defined spending category;

receive a binary output from the machine learning binary classifier indicating that the account not included in the training set is likely to have the non-sufficient funds event;

in response to receiving the binary output indicating that the account not included in the training set is likely to have the non-sufficient funds event, forecast a balance for the account not included in the training set, wherein forecasting the balance for the account not included in the training set includes:

identifying one or more projected future transfers for the account not included in the training set by identifying a pattern of past transfers associated with the account not included in the training set; and determining a forecasted balance by adjusting a current balance based on the one or more projected future transfers;

and provide, to a client device associated with the account not included in the training set, a notification based on the forecasted balance, the notification including a selectable option to transfer value from another account, receive, from the client device associated with the account not included in the training set, a request to transfer value from the another account; and transfer value from the another account into the account not included in the training set.

17. The non-transitory computer-readable storage medium of claim 16, wherein training comprises determining respective weights for the plurality of parameters.

18. The non-transitory computer-readable storage medium of claim 16, wherein the plurality of parameters include one or more of:
a past non-sufficient funds event;
a balance; and
an indication of decrease in income.

* * * * *